C. KAESTNER.
Sifting-Shovels.

No. 144,850.

Patented Nov. 25, 1873.

ATTEST.
N. J. Sprague
H. F. Eberts

INVENTOR.
Charles Kaestner
per Attorney —
Wm. S. Sprague

UNITED STATES PATENT OFFICE.

CHARLES KAESTNER, OF CHICAGO, ILLINOIS.

IMPROVEMENT IN SIFTING-SHOVELS.

Specification forming part of Letters Patent No. 144,850, dated November 25, 1873; application filed May 21, 1873.

*To all whom it may concern:*

Be it known that I, CHARLES KAESTNER, of Chicago, in the county of Cook and State of Illinois, have invented a new and useful Improvement in a Sifting-Shovel; and I do declare that the following is a true and accurate description thereof, reference being had to the accompanying drawings, and to the letters of reference marked thereon, and being a part of this specification, in which—

Figure 1:
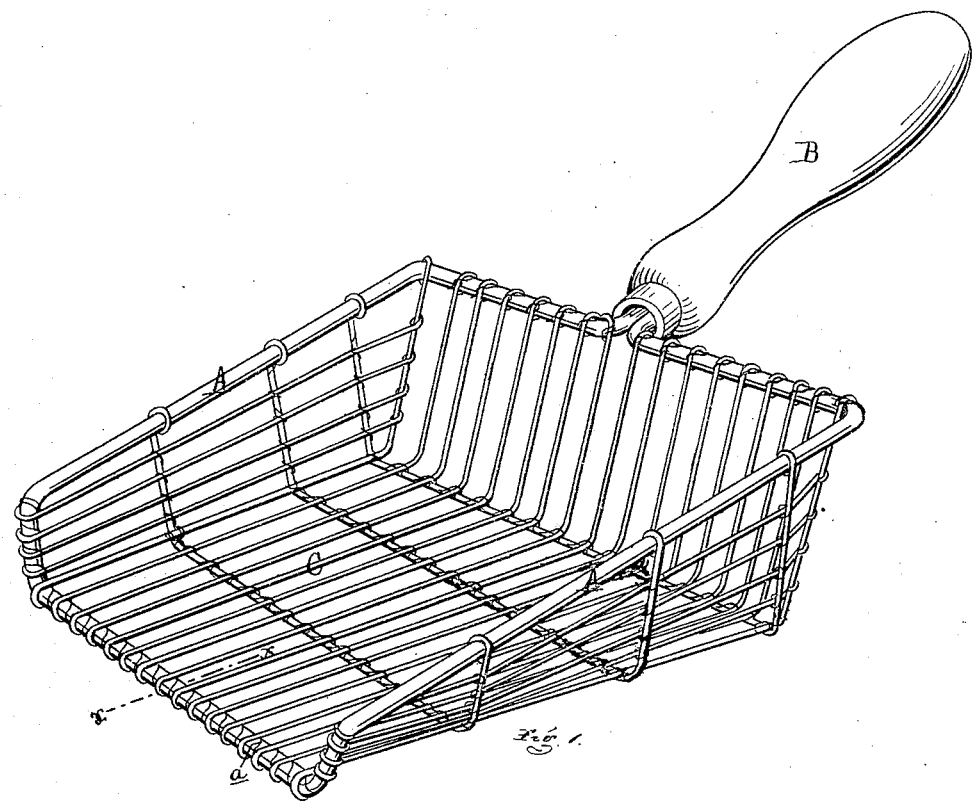
Figure 2:

Figure 1 is a perspective view. Fig. 2 is a cross-section at $x\ x$, Fig. 1.

This invention consists in constructing a shovel in the form of a screen, so that it can be used to separate unburned coals and cinders from ashes, the frame of the shovel being of heavy wire, inserted in a suitable handle, and the body of the shovel being of wire-screen, formed to the proper shape, and secured to the frame in the manner more fully hereinafter set forth.

In the drawing, A represents a strong wire frame, bent to the form shown, its two ends being brought together to form a tang, which is inserted in the wooden handle B. C is the body of the shovel, formed of open-meshed wire-screen cloth, molded to the form shown, and secured at its edges to the frame A by twisting the ends of the component wires around it, and "served," if necessary, by a lighter wire, as shown. That part of the frame which extends across the front end of the shovel is flattened in cross-section, as at $a$, Fig. 2, to facilitate its introduction under the material to be taken up.

As is well known, a very considerable percentage of unburned coal passes through with the ashes into the ash-pit of a stove or grate, which can be utilized by taking it up and returning it to the grate or fire-pot with this shovel.

It can also be used for separating impurities from grain.

I am aware that slotted shovels have been used for a like purpose, and, while I disclaim the invention thereof, What I do claim as my invention is—

The shovel described, having the handle B, frame A with flattened part $a$, and screen $c$, formed and united as described, for the purpose set forth.

CHARLES KAESTNER.

Witnesses:
WM. H. LOTZ,
THEODOR HURTZ.